(12) United States Patent
Engle

(10) Patent No.: US 7,172,295 B2
(45) Date of Patent: Feb. 6, 2007

(54) LED CONTROL SYSTEM WITH FEEDBACK

(75) Inventor: T. Scott Engle, Tualatin, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/842,898

(22) Filed: May 10, 2004

(65) Prior Publication Data

US 2005/0248737 A1    Nov. 10, 2005

(51) Int. Cl.
G03B 21/20 (2006.01)
G03B 21/28 (2006.01)

(52) U.S. Cl. .......................... 353/85; 353/99; 353/122

(58) Field of Classification Search ................... 353/30, 353/31, 37, 85, 99; 362/295; 348/771
See application file for complete search history.

(56) References Cited

U.S. PATENT DOCUMENTS

| | | | |
|---|---|---|---|
| 3,571,493 A * | 3/1971 | Baker et al. .................. 353/85 |
| 6,224,216 B1 | 5/2001 | Parker et al. | |
| 6,472,828 B1 | 10/2002 | Pruett et al. | |
| 6,474,818 B1 * | 11/2002 | Engle .......................... 353/31 |
| 6,520,648 B2 * | 2/2003 | Stark et al. ................... 353/85 |
| 6,535,187 B1 | 3/2003 | Wood | |
| 6,561,654 B2 * | 5/2003 | Mukawa et al. .............. 353/31 |
| 6,585,343 B2 * | 7/2003 | Bauer .......................... 347/14 |
| 6,666,896 B1 * | 12/2003 | Peng ............................ 353/85 |
| 6,733,137 B2 * | 5/2004 | Tomiya ........................ 353/84 |
| 7,052,138 B2 * | 5/2006 | Matsui ......................... 353/31 |
| 2004/0263802 A1 * | 12/2004 | Seki et al. .................... 353/99 |
| 2005/0073845 A1 | 4/2005 | Matsui | |
| 2005/0110958 A1 * | 5/2005 | Schwartz et al. ............. 353/85 |

FOREIGN PATENT DOCUMENTS

| EP | 1 018 723 A | | 7/2000 |
|---|---|---|---|
| JP | 2000-227561 | * | 8/2000 |
| JP | 2001188196 A | * | 7/2001 |

OTHER PUBLICATIONS

Machine translation of JP2000-227561.*

* cited by examiner

Primary Examiner—Christopher Mahoney
(74) Attorney, Agent, or Firm—Schwabe Williamson & Wyatt

(57) ABSTRACT

A method of controlling power provided to one or more light emitting diodes in a projection system comprises measuring light output from the one or more light emitting diodes. Based at least upon the measured light output, the power to at least one of the light emitting diodes is modified.

23 Claims, 3 Drawing Sheets

LED CONTROL SYSTEM WITH FEEDBACK

TECHNICAL FIELD

This invention relates to projection systems and more particularly to projection utilizing light emitting diodes (LEDs).

BACKGROUND OF THE INVENTION

Projection systems have been used for many years to project motion pictures and still photographs onto screens for viewing. More recently, presentations using projection systems have become popular for conducting sales demonstrations, business meetings, and classroom instruction.

In a common operating mode, projection systems receive video signals from a device such as a personal computer (PC), a digital video disk (DVD) player or other device capable of producing video signals. The video signals may represent still, partial-motion, or full-motion images of a type rendered by the device.

In prior art projection systems, typically a high intensity light source is employed to provide illumination. The illumination is then operated on by projection optics to reproduce the still, partial-motion, or full-motion images. The projection optics operate on the illumination in various ways. This typically includes the video signals controlling parts of the projection optics such as digitally driven image-forming devices, such as a liquid crystal display (LCD) or a digital micromirror device (DMD).

BRIEF DESCRIPTION OF THE DRAWINGS

Embodiments of the present invention will be described by way of the accompanying drawings in which like references denote similar elements, and in which.

DETAILED DESCRIPTION OF EMBODIMENTS OF THE INVENTION

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally, does not refer to the same embodiment, however, it may. The terms "comprising", "having" and "including" are synonymous, unless the context dictates otherwise.

Figure 1:
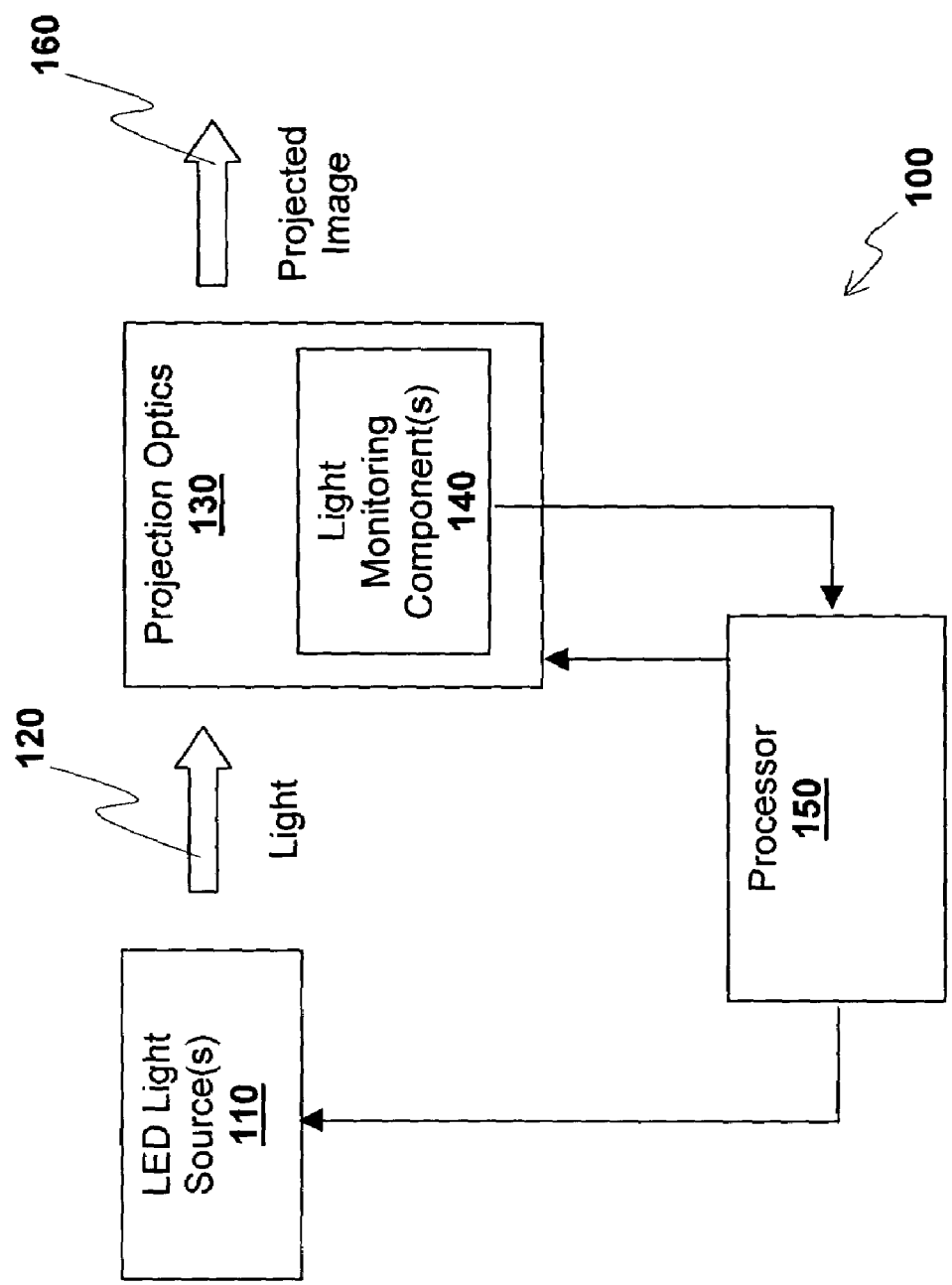
FIG. 1 illustrates a high level block diagram of an image projection system capable of utilizing closed loop feedback for monitoring light output from one or more light emitting diode (LED) light sources, in accordance with one embodiment.

FIG. 1 illustrates a high level block diagram of an image projection system 100 capable of utilizing closed loop feedback for monitoring light output from one or more light emitting diode (LED) light sources 110, in accordance with one embodiments. LED light sources 110 provide light 120 to projection optics 130. In alternate embodiments, other solid state light emitting devices may be employed. Projection optics 130 is broadly defined to include all optics utilized in the various aspects of processing light 120 from the LED light sources 110 to the projected image 160. For example, in one embodiment, the projection optics may include collection optics, a fold mirror and a light valve. The light valve may include, but is not limited to, one or more of a digital micromirror device (DMD), a reflective liquid crystal on semiconductor (LCOS) device, and a liquid crystal device (LCD), transmissive or reflective. The light at some point along the projection optics path may be sampled by light monitoring components 140. While the light monitoring components 140 are illustrated as part of the projection optics 130, they may not be in all cases. For example, in one embodiment, the light output from the LED light sources 110 may be sampled just after the LED light source 110. In such a case, the light monitoring components 140 may be considered to be separate from the projection optics 130. In another embodiment, the light output from the LED light sources 110 may be sampled after or during processing by some of the projection optics 130. In certain embodiments, as described below, the light monitoring components 140 may work in concert with the projection optics 130 to sample the LED light output. Information obtained by sampling the LED light output may be provided to a processor 150. The processor 150 may utilize this sampled information to control power provided to the LED light sources 110.

Figure 2:
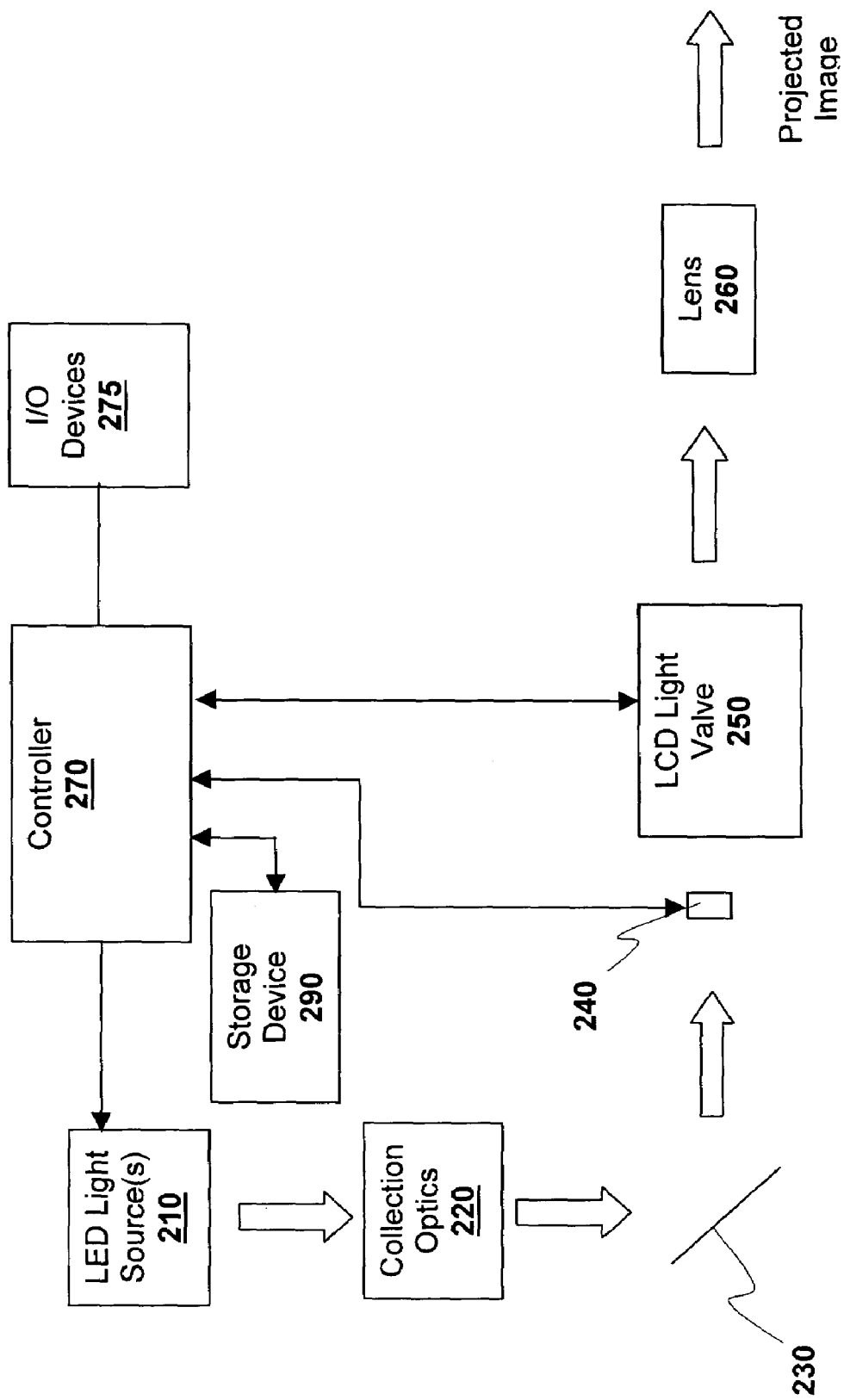
FIG. 2 illustrates a more detailed look at the closed loop control system, in accordance with one embodiment.

FIG. 2 illustrates a more detailed look at the closed loop control system, in accordance with one embodiment. LED light sources 210 provide light to collection optics 220. The collection optics 220 provide the collected light to a fold mirror 230. The fold mirror 230 provides the light to an LCD light valve 250. In the embodiment illustrated, a measuring device 240 may be located in the optical illumination path to provide feedback to controller 270. Thus, in this embodiment, prior to arriving at the LCD light valve 250, a portion of the light provided from the fold mirror 230 is absorbed by measuring device 240. The light absorbed by measuring device 240 is converted into electrical signals and provided as measured light to controller 270. The provision of measured light thus provides feedback on the light output by the LED light sources 210. The controller 270 may utilize the measured light to determine what modifications are to be made to the power provided to one or more of the LED light sources 210. In another embodiment, multiple measuring devices may be utilized in the optical illumination path to provide feedback to the controller 270. The light that is not absorbed or reflected as a result of the presence of measuring device 240 is operated on by LCD light valve 250 and subsequently provided to projection lens 260 for projection. The projection lens 260 may include, but is not limited to, a fixed focal length lens, a varifocal lens, and a zoom lens.

The determination by the controller 270 regarding the modifications to be made to the power provided to one or more of the LED light sources 210 may be based on desired light output levels provided by one or more sources. In one embodiment, controller 270 has access to desired light output levels for the LED light sources 210 via stored information in storage devices 290. In one embodiment the storage device is a ROM and the information on the desired light output levels is fixed at manufacturing time. In another embodiment the storage device is a non-volatile storage device. In this embodiment, default values are stored at manufacturing time. However, the user may provide, via one or more I/O devices 275 such as a touch LCD screen, updated information on the desired light output levels for the LED light sources. The updated information may be stored in a non volatile storage device. Non volatile storage device may include devices such as EEPROMs, Flash memory, non volatile RAM and Compact Disk Read/Write.

In various other embodiments, other techniques may be utilized to measure the light output of the LED sources. For example, in one embodiment, stray light is utilized to obtain an indication of the light output from LED sources. Stray light is light that would otherwise not be used in the projection of an image. For example, when core light goes through optics some of the light disperses and is unusable. This dispersed light may be utilized to measure the light output from the LED sources. In another embodiment, one or more photo optic light pipes are placed in the illumination path that read a consistent amount of light. These light pipes may then provide information to a controller on the light output corresponding to one or more of the LEDs. The measurement of light output may involve the measurement of one of a number of photonic metrics. Examples of photonic metrics include lumens, candellas and footcandels, and luminance.

Figure 3:
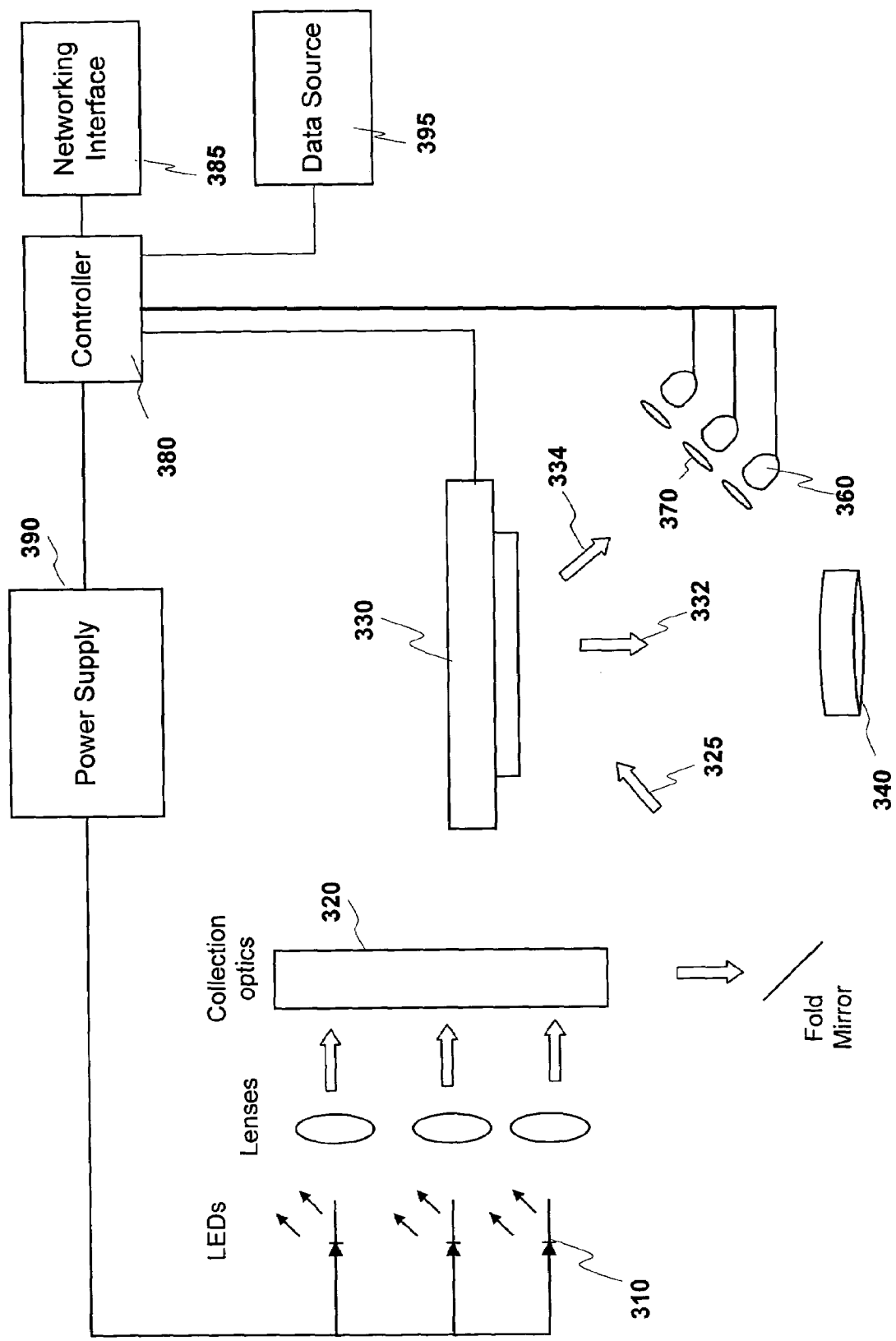
FIG. 3 illustrates a system for utilizing closed loop feedback, in accordance with another embodiment.

FIG. 3 illustrates a system for utilizing closed loop feedback, in accordance with another embodiment. Controller 380 receives image data (e.g. a frame of data) from image data source 395. LED light sources 310 provide light to collection optics 320. Collection optics 320 propagate light to a light valve. In the embodiment illustrated, the light valve is in the form of a digital micromirror device 330 (DMD). The controller may utilize image data to control, in part, the operation of the DMD 330. The DMD 330 may comprise an array of micromirrors. The array of micromirrors may correspond to pixel information associated with the image data. In one embodiment, during operation (e.g. in a non-off state) of the DMD 330, incident light 325 is projected in one of two directions for each mirror in the array, depending on the corresponding image data for that mirror. In one case, the incident light 325 is reflected in a first direction 332 to project light associated with the corresponding image data through a projection lens 340. In a second case, the incident light 325 is reflected in a second direction 334 to a dump area such that it will not be projected through the projection lens 340. The dump area is typically a portion of the projection system coated with a light absorbing material. The dump area absorbs the unprojected light and dissipates the unprojected light as heat. Thus, each of the mirrors, corresponding to a pixel of an image, will independently reflect a corresponding portion of the incident light 325 to either the lens or the dump area when rendering a frame of data.

In the embodiment illustrated in FIG. 3, three photo detectors 360 are placed in a location where the unprojected light is dumped by the DMD 330. In addition, three filters 370 are utilized to filter light to the photo detectors 360. For example, in one embodiment, a dichroic interference filter is utilized. In other embodiment, other types of filters such as other interference filters or absorption filters may be utilized.

In the embodiment illustrated, the three photo detectors 360 detect primary red, primary green and primary blue light information, respectively, as filtered by the dichroic interference filters 370.

The detected light information from the three photo detectors 360 is sent to the controller 380 as electrical information. The controller 380 analyzes the detected light information of the photo detectors 360. Based at least in part upon this detected light information, the controller 380 determines whether to send updated control information to power supply 390 to modify the power delivered to one or more of the LED light sources 310.

The light collected by the photo detectors 360 may be in direct proportion to the overall intensity of the LED light output. In such a case, the feedback signals generated by the photo detectors 360 may also be directly proportional to the LED light output. The controller 380 may utilize the feedback signals to compare the intensity or brightness of the LED light output to a threshold (e.g. desired) level corresponding to a desired intensity level. This desired level may be stored in memory, such as RAM or ROM, which may be accessed by the controller 380. If the intensity of the measured LED light output is greater or less than the desired level, the controller 380 may provide information to the power supply 390 that adjusts power to the LED light sources 310. This adjustment may be performed to bring the LED light output to the desired level.

In another embodiment, the controller may monitor the light output to determine if the measured light output is within a range of measurements. The controller 380 acts as a comparator that compares the feedback signals to upper and lower threshold values representing acceptable upper and lower brightness levels which have been provided to the controller 380. For example, each component in the illumination optical path has an efficiency with which it transfers the light generated by the LED light sources 310. Once the optical components are assembled, the system has an overall efficiency that may be generally constant at each location in the optical path. A nominal efficiency of the system may be determined by known analytical methods. Furthermore, known analytical methods may be used to determine the variation range of the brightness of the light generated by the LED light sources 310. This result may be combined with the nominal efficiency of the system to determine an acceptable range of brightness levels. The controller 380 compares the magnitude of the feedback signal generated by the photo detectors 360 with upper and lower brightness range values. These upper and lower brightness range values may be expected signal values corresponding to the acceptable range of brightness levels. The comparison is performed to determine the brightness level of the light output from the LED light sources 310. If the magnitude of the feedback signal falls outside of the acceptable brightness range values the controller 380 adjusts the voltage delivered from the power supply 390 to the LED light sources 310 until the magnitude of the feedback signal falls within the acceptable brightness range values.

The desired signal levels associated with the measured light output can be set by creating an electrical circuit to generate a desired output for comparison based on the aforementioned analytical methods or by basing it on empirical methods. Furthermore, as previously mentioned, the desired signal levels can be set based on user input through a user interface and stored in the system electronics such as a RAM or non-volatile memory. Alternatively, the desired signal levels may be provided through a networking interface 385. With a networking interface, the desired signal levels may be provided remotely by a technician. For example, the desired signal levels may be utilized remotely to diagnose a problem associated with the projection system. In another embodiment, the desired signal levels may be provided periodically by a customer support center. This may, for example, provide optimum values for maximizing LED life.

In one embodiment, a method of achieving brightness control is to use the feedback signal from the photo detectors to adjust the current provided to the LED light sources 310. However, other methods could be used. For example, instead of adjusting the power to the LED light sources 310 the feedback signal could be used to control other components such as, for example, the light valve. If the LED light output is too high, the light valve can be closed for a longer portion of the display dwell time, sending more of the light to the "dump" location instead of to the lens. Alternatively, if the LED light output is too low the light valve can be opened for a longer portion of the display dwell time sending more of the light to the display screen instead of the "dump" location.

As previously discussed, the use of photo detectors 360 creates feedback directed to the controller 380. Feedback assists in forming a closed loop system to facilitate adjustments to the LED light sources 310 or other system components in order to automatically maintain a desired illumination output. Another use of the closed loop feedback system may be for automatic color correction. In one embodiment, the closed loop system may be operated in a manner to use the feedback signals generated by the photo detectors 360 to automatically adjust the power to the LED light sources 310 to maintain a desired light output level for each of the LED light sources 310.

Typically systems are designed to provide a light source that provides "white" light at a particular "white point" or "color temperature". Thus, when a projection device leaves a factory, the light source, e.g. the LED light sources together, will produce light at a particular color temperature. Over time the light source may see its color temperature change. In the case of a system having a number of LED light sources 310, this change in color temperature may be due to one of the LED light sources 310 changing its light output at a different rate compared to one or more of the other LED light sources 310.

In one embodiment of the present invention, the relative output of the LED light sources can be measured. In this manner, the light produced by each of the LED light sources may be compared to measurements corresponding to each LED light source. From these measurements a determination may made about a desired change in output of the individual LED light sources. From this determination, the power delivered to individual LED light sources may be modified to increase the respective LED light source's light output.

For example, referring again to FIG. 3, the filters 370 may be utilized to filter light corresponding to the output of individual LED light sources 310. In the embodiment illustrated, the LED light sources 310 correspond to a primary red, a primary green and a primary blue color. The filters 370 are utilized to separate the light in a corresponding manner to the LED light sources. Thus, the individual measured readings sent to controller 380 correspond to each of the light generating LED light sources 310. The controller 380 may then determine the individual light output as indicated by measured readings. The controller may compare the individual readings to desired individual levels. The desired individual levels may be obtained in various manners as previously discussed.

In various embodiments, sampling and analysis of the detected light information may be performed at various times. For example, the sampling of the detected light information may occur at periodic intervals. The analysis of this information may be on each sample or it may be performed occasionally with the values being averaged over a period of time. The sampling may be performed in a manner that provides for consistent measurements from one sample to the next. To effectuate such a sampling, in one embodiment, the DMD 330 is turned to full black during the sampling period. That is, during the sampling period, the DMD 330 is operated such that substantially all light is dumped to the dump area. Thus, substantially all of the light incident on the DMD 330 is directed to the photo detectors 360. This ensures that the magnitude of the signal generated by the photo detectors 360 is not affected by the number of pixels or mirrors of the DMD 330 being on or off.

The sampling period may vary depending upon the implementation. For example, in an embodiment utilizing a DMD 330, a portion of a frame may be spent dumping the light to the dump area. In such a case, a frame of data is received from a data source 395. During a first portion of the data frame, the data received from the data source 395 is utilized by the controller 380 to drive DMD 330 to produce an image to be projected through lens 340. During a second portion of the frame, the DMD 330 is driven by the controller 380 to dump light to the dump area. In another embodiment, operations in the first and second portions of the frame are similar. However, in a third portion of the data frame, the controller 380 utilizes the data received from the data source to drive DMD 330 to again produce an image to be projected through lens 340.

Thus, it can be seen from the above description, methods for controlling light output of LED light sources and projection systems so equipped have been described. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

The invention claimed is:

1. A projection apparatus, comprising:
   a plurality of light emitting devices;
   a light valve comprising a plurality of valvelets optically coupled to the plurality of light emitting devices, each valvelet being controllable to direct light emitted by the light emitting devices and incident on the valvelet to either a projection path or a dump path;
   one or more photo detectors located on the dump path to measure at least one characteristic of the light emitted by least one of the light emitting devices, and directed onto the dump path, the one or more photo detectors outputting at least one electrical signal indicative of the at least one characteristic measured;
   a controller coupled to the plurality of light emitting devices and the one or more photo detectors to control an output characteristic of the light emitted by the at least one light emitting device based at least in part upon the at least one characteristic measured indicated by the at least one electrical signal; and
   wherein the plurality of light emitting devices comprise three light emitting devices, and the one or more photo detectors comprise three photo detectors.

2. The projection apparatus of claim 1 comprising one or more dichroic filters correspondingly associated with the one or more photo detectors.

3. The projection apparatus of claim 1 wherein the light valve comprises a digital micromirror device comprising a plurality of micromirrors, the micromirrors being the valvelets.

4. The projection apparatus of claim 1 wherein the light valve comprises a liquid crystal device.

5. The projection apparatus of claim 1 further comprising a power supply disposed in between and coupled to the controller and the light emitting devices.

6. The projection apparatus of claim 5, wherein the controller is adapted to control power delivered from the power supply to the at least one light emitting device, based at least in part on the at least one characteristic measured indicated by the at least one electrical signal.

7. The projection apparatus of claim 1 wherein each light emitting device emits a different color selected from a group consisting of a primary red color, a primary blue color and a primary green color.

8. The projection apparatus of claim 1 further comprising three dichroic filters correspondingly associated with the three photo detectors.

9. The projection apparatus of claim 1 wherein the at least one characteristic of the light emitted by at least one of the light emitting devices comprises a white point of the light emitted, and the at least one electrical signal indicating a level of the white point, and the controller is adapted to:
   analyze the indicated level of the white point of light emitted by the at least one of the light emitting devices;
   compare the indicated level of the white point to a baseline white point; and
   adjust power delivered to the at least one light emitting device based on the result of the compare.

10. The projection apparatus of claim 9 wherein said light valve comprises a digital micromirror device, and the controller is further adapted to:
   receive image data associated with a frame from a data source;
   configure the digital micromirror device to direct an appropriate portion of the light emitted by the light emitting devices to the projection path to display the image data during a first portion of a frame; and
   configure the digital micromirror device to direct substantially all light emitted by the plurality of light emitting devices to the dump path during a second portion of a frame.

11. The projection apparatus of claim 9 wherein the apparatus further comprises an input/output device for a user to provide the baseline white point.

12. The projection apparatus of claim 9 wherein the apparatus further comprises an electronic storage device to store the baseline white point.

13. The projection apparatus of claim 12 wherein the electronic storage device is one selected from the group consisting of non-volatile random access memory (RAM), Flash memory, non-volatile RAM and Compact Disk Read/Write.

14. A method comprising:
   outputting light from a plurality of light emitting devices of a projection apparatus directable to either a projection path or a dump path, wherein the plurality of light emitting devices comprise three light emitting devices;
   directing at least a portion of the light outputted by the plurality of light emitting devices to the dump path;
   measuring by a plurality of photo detectors at least one characteristic of the light emitted by at least one of the light emitting devices, and directed onto the dump path, the plurality of photo detectors comprise three photo detectors;
   providing at least one electrical signal indicative of the at least one characteristic measured; and
   based at least in part upon the at least one electrical signal indicative of the at least one characteristic measured, controlling an output characteristic of the light emitted by the at least one light emitting device.

15. The method of claim 14 wherein said measuring comprises performing the measuring during a first portion of a data frame of the projection system.

16. The method of claim 14 wherein the directing comprises switching one or more micromirrors of a digital micromirror device optically coupled to the plurality of light emitting devices such that substantially all light output from the at least one light emitting device received at the digital micromirror device is reflected to the one or more light collecting devices.

17. The method of claim 14, wherein said measuring comprise measuring frequency of the light emitted by the at least one light emitting device and wherein said controlling an output characteristic of the light emitted by the at least one light emitting device comprises modifying power to the at least one light emitting device when the measured frequency of the light emitted by the at least one light emitting device deviates from a baseline frequency.

18. The method of claim 17 where the baseline frequency comprises a range of frequencies.

19. The method of claim 14 wherein the controlling an output characteristic of the light emitted by the at least one light emitting device comprises modifying power to the at least one light emitting device when a measured brightness of the light emitted by the at least one light emitting device decreases below a threshold level.

20. The method of claim 14 wherein said measuring comprises placing said plurality of photo detector in the dump path.

21. The method of claim 14 wherein said measuring comprises capturing stray light not utilized in the projection of an image.

22. A projection apparatus comprising:
   one or more light collectors optically coupled to a plurality of light emitting devices;
   a light valve comprising a plurality of valvelets optically coupled to the one or more light collectors, each valvelet being controllable to direct light emitted by the light emitting devices and incident on the valvelet to either a projection path or a dump path
   one or more photo detectors located on the dump path to measure at least one characteristic of the light emitted by at least one of the light emitting devices, and directed onto the dump path, the one or more photo detectors outputting at least one electrical signal indicative of the at least one characteristic measured to facilitate control of an output characteristic of the light emitted by the at least one light emitting device based at least in part on the measured characteristic; and
   wherein the plurality of light emitting devices comprise three light emitting devices, and the one or more photo detectors comprise three photo detectors.

23. A projection apparatus comprising:
   a plurality of light emitting devices;
   a light valve comprising a plurality of valvelets optically coupled to the plurality of light emitting devices, each valvelet being controllable to direct light emitted by the light emitting devices and incident on the valvelet to either a projection path or a dump path;

one or more photo detectors located on the dump path to measure at least one characteristic of the light emitted by at least one of the light emitting devices, and directed onto the dump path, the one or more photo detectors outputting at least one electrical signal indicative of the at least one characteristic measured;

a controller coupled to the plurality of light emitting devices and the one or more photo detectors to control an output characteristic of the light emitted by the at least one light emitting device based at least in part upon the at least one characteristic measured indicated by the at least one electrical signal;

wherein the at least one characteristic of the light emitted by at least one of the light emitting devices comprises a white point of the light emitted, and the at least one electrical signal indicating a level of the white point, and the controller is adapted to:

analyze the indicated level of the white point of light emitted by the at least one of the light emitting devices;

compare the indicated level of the white point to a baseline white point; and adjust power delivered to the at least one light emitting device based on the result of the compare;

wherein said light valve comprises a digital micromirror device, and the controller is further adapted to:

receive image data associated with a frame from a data source;

configure the digital micromirror device to direct an appropriate portion of the light emitted by the light emitting devices to the projection path to display the image data during a first portion of a frame; and configure the digital micromirror device to direct substantially all light emitted by the plurality of light emitting devices to the dump path during a second portion of a frame.

* * * * *